United States Patent [19]

Meiners

[11] 3,762,483
[45] Oct. 2, 1973

[54] CHISEL PLOW CONSTRUCTION
[75] Inventor: Elmo R. Meiners, Anchor, Ill.
[73] Assignee: M. & W. Gear Company, Inc., Gibson City, Ill.
[22] Filed: Dec. 8, 1970
[21] Appl. No.: 96,055

[52] U.S. Cl.................. 172/700, 172/722, 172/769
[51] Int. Cl........................................... A01b 13/08
[58] Field of Search.................. 172/700, 749, 719, 172/720, 722, 752, 759, 764, 196, 769

[56] References Cited
UNITED STATES PATENTS

| | | | |
|---|---|---|---|
| 953,867 | 4/1910 | Stallings | 172/722 |
| 2,062,197 | 11/1936 | Thompson | 172/722 |
| 2,227,670 | 1/1941 | Peterson | 172/699 |
| 185,108 | 12/1876 | Jones | 172/700 |
| 1,034,546 | 8/1912 | Wells | 172/752 X |
| 152,201 | 6/1874 | Wariner | 172/700 |
| 2,672,805 | 3/1954 | Longenbach | 172/759 |

FOREIGN PATENTS OR APPLICATIONS

| | | | |
|---|---|---|---|
| 1,341,546 | 9/1963 | France | 172/700 |

*Primary Examiner*—Robert E. Pulfrey
*Assistant Examiner*—Stephen C. Pellegrino
*Attorney*—Molinare, Allegretti, Newitt & Witcoff

[57] ABSTRACT

The improved chisel plow for use in tilling soil includes a curved support shank. At the end of the shank, an upwardly extending earth moving blade is attached to a bracket and to the shank by means of a nut bolt assembly. A narrower earth plowing chisel blade is also attached to the shank by means of a second nut bolt assembly and the bracket. The blades cooperate, aerate, plow and overturn the soil to one side of the support shank.

1 Claim, 4 Drawing Figures

PATENTED OCT 2 1973 3,762,483
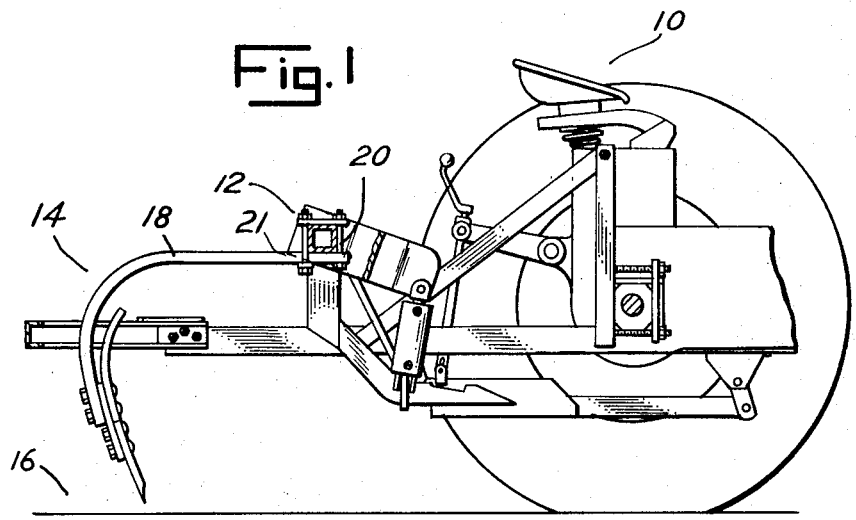
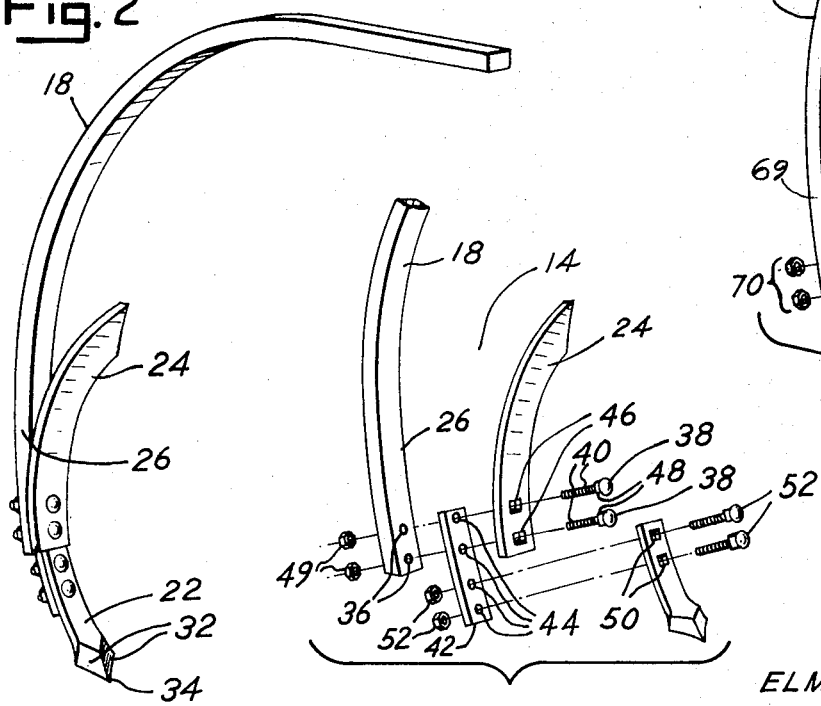
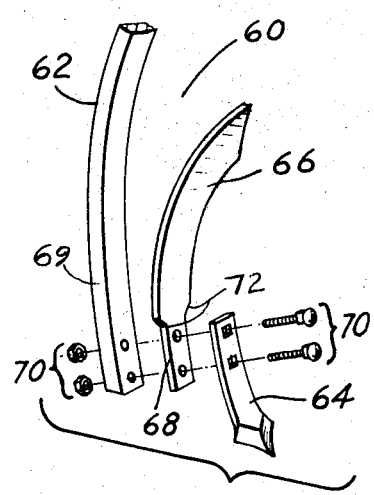
INVENTOR.
ELMO R. MEINERS
BY Molinare Allegretti
Newitt, & Witcoff
ATTORNEYS

CHISEL PLOW CONSTRUCTION

BACKGROUND OF THE INVENTION

The present invention is generally related to an improved chisel plow construction for use with soil treating machinery. Devices have been designed in the prior art for use in conjunction with a trailer vehicle to be pulled by a tractor which engage and dig into the soil while the tractor moves the trailer across the area to be plowed. Such devices, while useful for their intended purpose, have not provided for the easy and efficient independent replacement of individually worn parts.

It is generally desirable to provide such a device of simple and economic construction having parts which may be replaced independently when such parts become worn. It is also desirable to provide such a device having one chisel blade to engage and plow the earth and a second blade to further plow and overturn the earth to one side or the other. In this manner waste crops such as corn stalks and the like may be easily plowed back into the soil and trash on the soil surface may be covered over to prepare the soil for replanting and to provide a more fertile area for further growth.

SUMMARY OF THE INVENTION

In a principal aspect the present invention relates generally to an improved chisel plow for use with a vehicle to plow earth. The improved chisel plow includes a support shank having a shank mounting end and a blade mounting end, an earth plowing blade connected to the blade mounting end of the shank extending downwardly therefrom and an earth moving blade also connected to the blade mounting end of the shank. The earth moving blade extends upwardly from the blade mounting end of the shank.

One preferred embodiment of this invention includes a mounting bracket adapted to be connected to the blade mounting end of the shank and to rigidly receive the earth-moving blade and the earth-plowing blade.

In a second preferred embodiment of this invention the mounting member is eliminated.

BRIEF DESCRIPTION OF THE DRAWINGS

There follows a brief description of the drawings of two presently preferred embodiments of the present invention wherein like numerals refer to like elements and wherein:

FIG. 1 is a side view of a portion of a tractor pulling a trailer which employs the improved chisel plow construction of this invention;

FIG. 2 is a perspective view of a preferred embodiment of the improved chisel plow construction of this invention;

FIG. 3 is an exploded perspective view of the components of the improved chisel plow construction shown in FIG. 2; and FIG. 4 is an exploded perspective view of a second preferred embodiment of the chisel plow of this invention.

DETAILED DESCRIPTION OF THE PREFERRED EMBODIMENT

A portion of a tractor 10 is shown in FIG. 1 connected to pull a farm implementtrailer 12. The trailer 12 includes the improved chisel plow 14 connected thereto and positioned to plow the soil 16. In practical operation a number of these chisel plows 14 are connected to the trailer 12. The plow 14 includes a support shank 18 which is rigidly connected to a trailer tool bar 20 at shank mounting end 21. Shank 18 is curved in an arc somewhat greater than 90°. When the plow 14 is connected to the tool bar 20, the shank mounting end 21 is substantially horizontal and the blade mounting end 26 is inclined downwardly and in the direction of vehicle travel which is toward the right in FIG. 1.

As may be seen in FIG. 2, the shank 18 has a rectangular cross sectional shape. A downwardly extending earth-plowing chisel blade 22 and an upwardly extending earth-moving blade 24 are connected to a blade mounting end 26 of the support shank 18. The chisel blade 22 is tapered to define two plowing surfaces 32 which intersect to define a point 34 of the plow 14. These surfaces 32 allow the blade 22 to readily plow the soil 16. The blade 22 is connected to the support shank 18 so that it projects downwardly into the earth from the blade mounting end 26 and so that it is inclined slightly toward the direction of vehicle travel.

The earth-moving blade 24 is also connected to the blade mounting end 26 of the support shank 18. This blade 24 is connected so that it projects upwardly from the end 26 and away from the chisel blade 22. As may be seen from the drawing, this blade 24 is wider than the earth-plowing blade 22. It functions to plow the top soil above blade 22 and to also move the plowed soil upwardly and towards one side of the support arm 18. The earth-moving blade 24 is banked or curved to one side of the support shank 18 in order to divert the soil to one side of the arm 18. The blade 24 is wider in order that the top portion of the soil is more completely agitated and plowed.

Thus, when the tractor 10 or other pulling device is operated to move the trailer 12 and the plow 14, the support shank 18 holds the blades 22 and 24 in the ground. The blade 22 is positioned deeper in the soil and is narrow in order to reduce drag. However, it has been found possible and advantageous to provide the wider blade 24 for plowing the soil to a shallow depth without providing a great amount of undesired drag, particularly when used in conjunction with the lower, narrower blade 22. Additionally, wider blade 24 diverts the plowed soil towards one side of the support shank 18. In this manner, the soil 16 may be unearthed and turned over, thus burying any waste or trash such as corn husks, corn stalks and the like.

The construction of a preferred embodiment of the improved chisel plow 14 may be more clearly seen in the exploded view shown in FIG. 3. The blade mounting end 26 of the support shank 18 includes two apertures 36 defined therein. These apertures 36 are adapted to receive a pair of bolts 38 having threaded ends 40 thereon. A support bracket 42 having four apertures 44 defined therein is also provided. Two rectangularly shaped apertures 46 are defined on the earth-moving blade 24 to receive the rectangularly shaped necks 48 of the bolts 38. In this manner, the bracket 42 may be "sandwiched" or secured intermediate the end 26 of the support shank 18 and the wider earth-moving blade 24 with the bolts 38 secured by a pair of nuts 49.

The bracket 42 extends beyond the end 26 of the support shank 18 and is adapted to rigidly receive the narrower earth-plowing chisel blade 22. The two apertures 44 of bracket 42 which project beyond the support shank 18 are spaced uniformly with the square-shaped holes 50 defined in the chisel blade 22. In this manner, the blade 22 may be rigidly secured to the bracket 42 by means of a nut and bolt assembly 52. As may be seen, when either the wider earth-moving blade 24 or the narrower earth-plowing chisel blade 22 become worn, either blade may be replaced separately without replacing the other blade. It has been found that the blades 22 and 24 wear out at different intervals with the earth-plowing blade 22 requiring the more frequent replacement.

Typically, the narrow earth-plowing blade chisel blade 22 is approximately 2 inches in width and the wider earth-moving blade 24 is approximately 4 inches in width. This arrangement facilitates the plowing operation of the earth-plowing chisel blade 22 and allows blade 22 to move more easily through the soil 16. The earth-moving blade 24 of this design operates at a depth of approximately 4 to 6 inches in the soil 16, whereas the tip 34 of the plowing blade 22 is approximately 10 inches below the soil line. The blades 22 and 24 define a common earth engaging surface as can be seen by examining FIG. 2.

In a second preferred embodiment, shown in FIG. 4, an improved plow 60 includes a support arm or shank 62, a downwardly extending earth-plowing chisel blade 64 and an upwardly extending earth-moving blade 66. A mounting member extension 68 more narrow in width than the blade 66 is integral with the earth-moving blade 66 at one end thereof. The extension 68 adapted to be "sandwiched" between the earth-plowing chisel blade 64 and blade mounting end 69 of the shank 62. A nut bolt assembly 70 is provided as the means for rigidly connecting the blades 64 and 66 to the shank 62. This construction eliminates bracket 44 components from the plow construction of the first preferred embodiment and provides for the easy and independent replacement of the blades 64 and 66. However, this embodiment does not provide a common earth-engaging surface as did the first embodiment. Also, it should be noted that blade 66 includes an inclined connecting portion 72 which interconnects the extension 68 and blade 66. This inclined portion promotes the gradual transition from the narrow blade 64 to the wide blade 66 and may be tapered even more gradually depending on soil conditions and drag characteristics of the plow. Of course, the taper can be eliminated completely as shown in the embodiments of FIGS. 2 and 3. In any event, the tapered portion 72 constitutes a part of the invention.

While in the foregoing there has been described two presently preferred embodiments of the present invention, it is to be understood that numerous modifications may be made to these embodiments without departing from the true spirit and scope of this invention. It is also understood that the phrase "earth-moving blade" includes a blade which may function as a plow as well as a mold board to guide soil over trash in the field as described.

What is claimed is:

1. An improved chisel plow construction comprising, in combination:

a curved shank having an upper run for attachment to a plow pulling mechanism and a lower run extending downwardly and forwardly toward the direction of plow travel, said lower run having a plow connection portion at the forward end thereof;

a chisel blade connected to said connection portion by fastening means and extending forwardly and downwardly from the forward end of said shank, said chisel blade comprising a substantially rectangular plate with the longer sides of the plate substantially parallel to the lower run of said shank, and having a terminal, earth breaking point extending from a shorter side of said plate forwardly and downwardly; and an earth moving member attached to the shank connection portion by fastening means, said member comprising a partially curved plate which is a coplanar extension of said chisel blade plate, said partially curved plate including a lower, uncurved portion adjacent said chisel blade and an upper portion curved to one side of a path traversed by said plow to discharge trash from said plow as said lower portion extends below grade level for breaking earth during operation of said plow, said earth moving member having a width substantially two times the short side dimension of said rectangular chisel blade to more completely agitate and plow soil above said chisel blade.

* * * * *